2 Sheets—Sheet 1.
N. T. Edson,
Making Carriage Wheels.
N°32,277. Patented May 14, 1861.
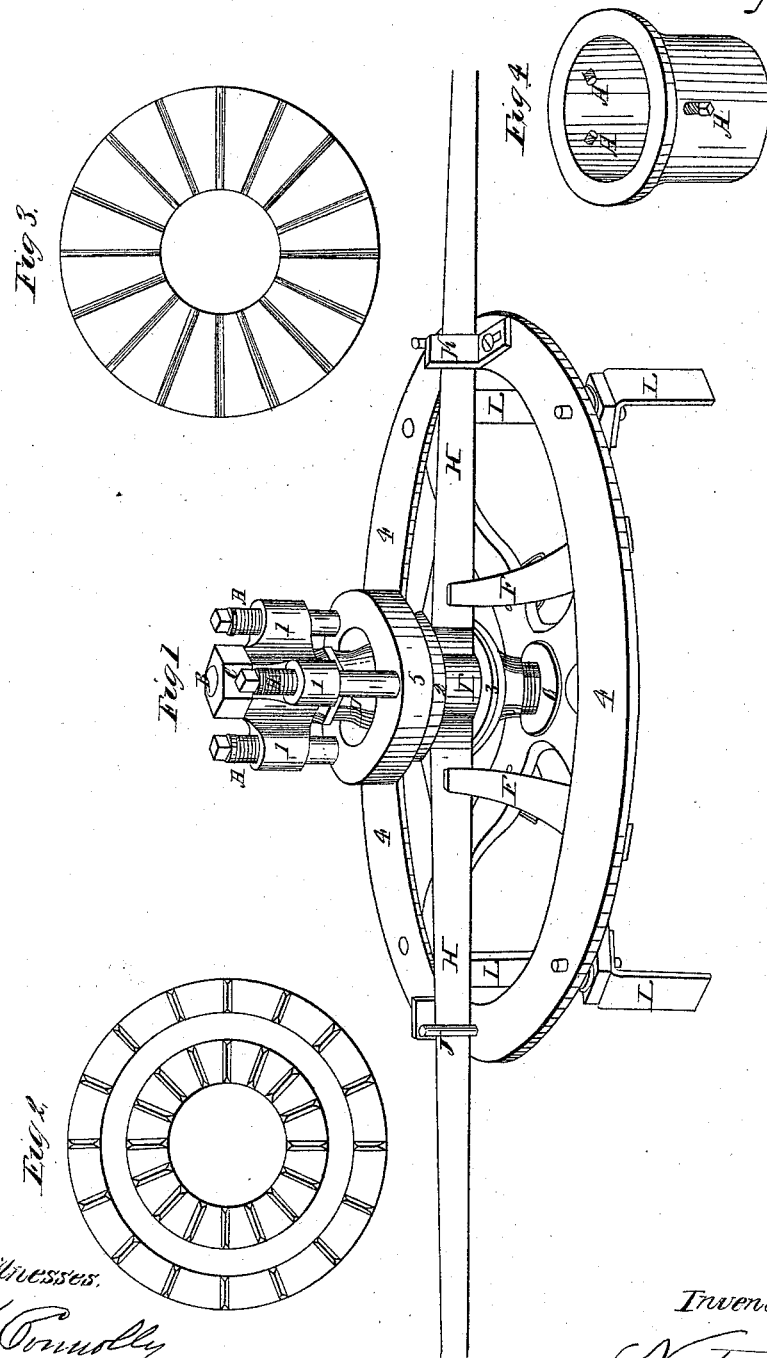
Witnesses.
E. J. Connolly
B. Franklin Wise
Inventor
N. T. Edson

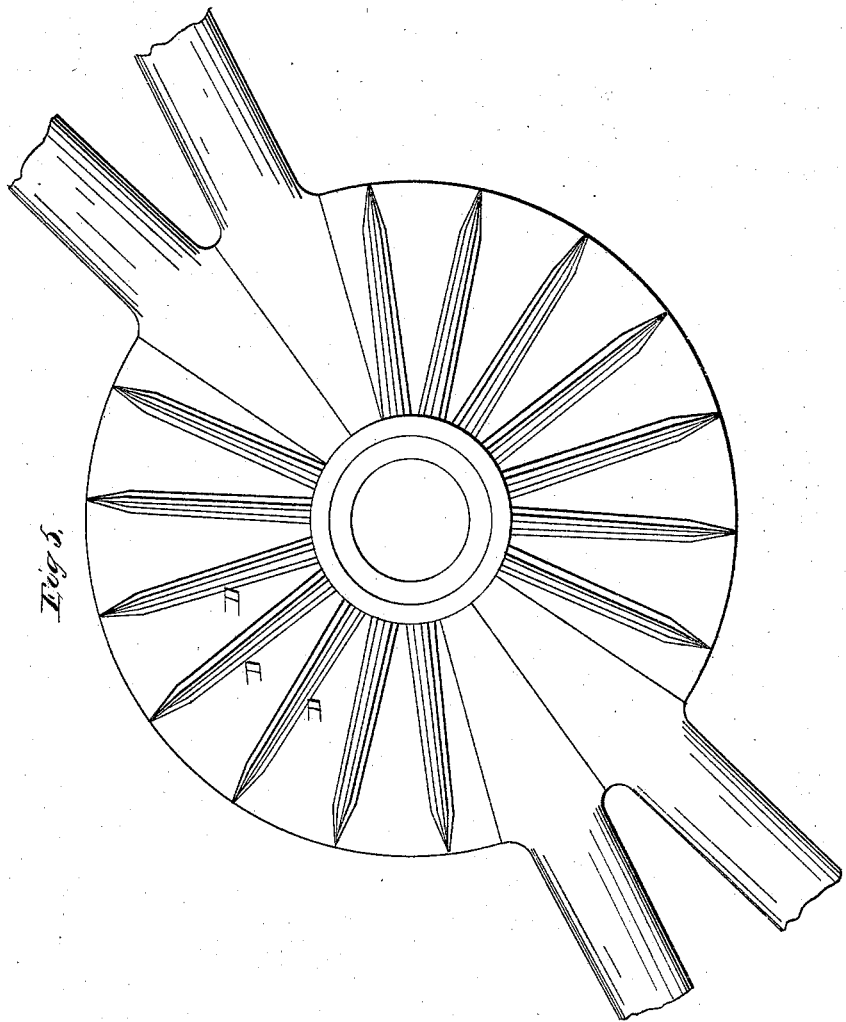

UNITED STATES PATENT OFFICE.

N. T. EDSON, OF NEW ORLEANS, LOUISIANA.

WHEELWRIGHT'S MACHINE.

Specification of Letters Patent No. 32,277, dated May 14, 1861.

*To all whom it may concern:*

Be it known that I, N. T. EDSON, of New Orleans, paris of Orleans, and State of Louisiana, have invented certain new and useful Improvements in Machines for Making Carriage-Wheels; and I do hereby declare that the following is a full, clear, and exact description of the same, reference being had to the accompanying drawings, forming part of this specification, in which—

Figure 1 is a perspective view of my machine with a hub (composed of two metallic flanches box and nut) and two spokes placed therein.

Fig. 2 and Fig. 5 represent the inner or lower surface of the flanch 2 Fig. 1, the projections D. D. D. entering corresponding grooves formed in the spokes, by which means the spokes on being driven with a light pressure upon the ring and flanch by turning the screws A. A. A. are forced one against the other and held in their respective positions in the hub and also admit of a spoke being removed and replaced without displacing the whole.

Fig. 3 is also an inside view of flanches with projections which correspond with the size and form of the tenon of the spokes and which projections, are divided by grooves of the same form, two of which flanches are used to form a hub with the grooves of one flanch opposite to the projections of the other, by the use of which flanches, wheels of dogged spokes are made.

A. A. A. in Fig. 1 are screws which pass through the headpiece 1 as seen at 1. 1. 1. by which the ring 5 is forced down upon the upper flanch 2 with an equal pressure on all parts. B. is a bolt passing through the head piece 1 box E. base G. and terminating with a nut or head on its lower end. C. is a nut which screws down to the head piece 1 on the bolt B. to hold the headpiece while the screws are being turned down on the ring 5 and the nut D. screwed down to the flanch 2. D is a nut screwed upon box E. which rests upon and holds the flanch 2 down upon the spokes H. H. after the flanch has been pressed sufficiently hard with the screws A. A. A. F. F. are guides attached to the base G. and which together with the pins J. and knees K. hold the spokes straight with each other on the flanch 3. 4 is a rim resting on the four arms of the base G. which holds the spokes to a proper elevation for the dish of the wheel. L. L. L. L. are the feet or supports of the machine.

Fig. 4 is a tube to be placed on the base G. to receive the pressure of the lower flanch 3, as that flanch without such support is liable to be broken when the spokes are being pressed. A. A. A. Fig. 4 are set screws to press against the box to prevent its turning in the hub while the nut D. is being screwed down if the wheels are to be used in a cold climate the box E. should be made of malleable iron or steel and with both flanches movable or separate from the box.

In the use of my machine in making the ordinary wood hub wheels the tube Fig. 4 is dispensed with the headpiece with its screws and the ring 5 may in most instances also be dispensed with and the nut C. turned directly down on the hub to hold it true with the rim 4 while all the spokes are being driven and the felly or rim of the wheel being put on.

Having thus described my invention what I claim therein as new and desire to secure by Letters Patent is—

The combination of the form or stand L. G. 4, bolt B., head piece 1, ring 5, and supporting tube or thimble A. constructed and operated substantially as described.

N. T. EDSON.

Witnesses:
D. F. MITCHELL,
I. F. DICK.